R. M. BRANDON.
HOSE COUPLING.
APPLICATION FILED AUG. 29, 1917.

1,261,687.

Patented Apr. 2, 1918.

INVENTOR.
RALPH M. BRANDON
BY
Atty.

UNITED STATES PATENT OFFICE.

RALPH M. BRANDON, OF LOS ANGELES, CALIFORNIA, ASSIGNOR OF ONE-HALF TO ROBERT F. PETERMAN, OF PASADENA, CALIFORNIA.

HOSE-COUPLING.

1,261,687.

Specification of Letters Patent.

Patented Apr. 2, 1918.

Application filed August 29, 1917. Serial No. 188,750.

*To all whom it may concern:*

Be it known that I, RALPH M. BRANDON, a subject of the King of Great Britain, residing at Los Angeles, in the county of Los Angeles and State of California, have invented new and useful Improvements in Hose-Couplings, of which the following is a specification.

This invention relates to a hose coupling for connecting sections of hose of large diameters, such as fire-hose and the like.

It is the object of this invention to provide a hose coupling which can be quickly connected and disconnected without rotating the coupling or hose ends, and in which the operation of the coupling may be effected without the use of tools. Another object is to provide means for drawing the coupling members tightly together to form a non-leakable joint, and also provide means for locking the coupling members in their joined position to hold the coupling against accidental disconnection. A further object is to provide a coupling which is simple in construction and operation. Other objects will appear hereinafter.

The invention is illustrated in the accompanying drawings in which.

Figure 1:
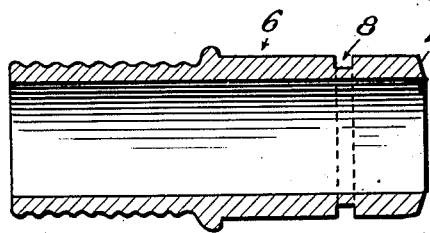
Figure 1, is a view in vertical section of the tubular male member.

More specifically 6 indicates a tubular male member which is adapted to be attached to a hose end in the usual manner and which is formed with a tapered or beveled outer end 7 and has a circumferential channel 8 adjacent to said beveled end. 9 indicates a tubular member having differential diameters forming a beveled shoulder 10 around its inner wall intermediate its ends, the reduced end of which member is adapted to be attached to a hose end. The enlarged outer end of the tubular member 9 is internally threaded to receive a threaded collar 11 having an internal diameter slightly larger than the outer diameter of the male member to receive the latter. The inner end of the collar is spaced from a shoulder 12 to form a channel on the inner wall of the enlarged end of the tube in which a contractible split ring 13 is loosely mounted. This ring has an internal diameter large enough to permit the male member to pass therethrough, and is formed with a beveled rear face which is designed to engage the forward wall of the channel 8 to advance the male member when the ring is contracted into the channel 8, as will be later described.

Figure 2:
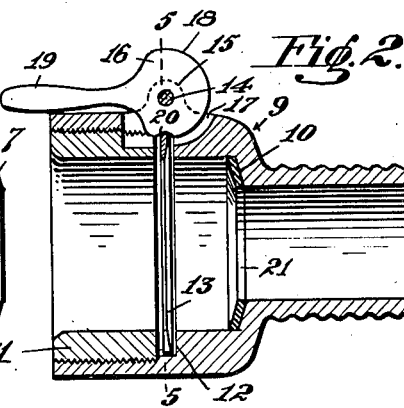
Fig. 2, is a view in vertical section of the tubular receiving member, showing the parts arranged to receive the male member.

Mounted on a pivot pin 14 carried on lugs 15 on the member 9, is a locking cam 16 extending into a slot 17 in the member 9. The cam is formed with an arcuate face 18 eccentric to the pivot 14, which is adapted to bear upon the split ring as the cam is turned to depress and contract the latter into engagement with the channel 8. A handle 19 is formed on the cam by which it may be rocked on its pivot; the handle normally extending forwardly as shown in Fig. 2. When thus disposed, the ring will bear against the cam and seat in a slight depression 20 therein to hold the cam against free movement on its pivot when not in its locking position.

Figure 3:
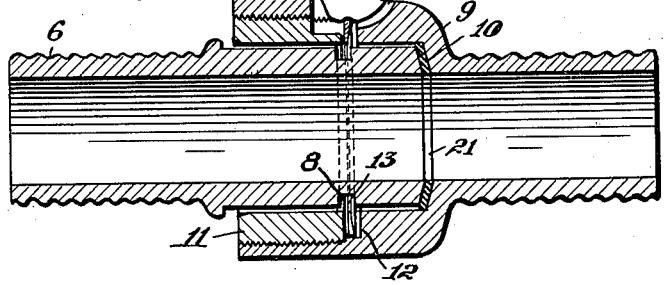
Fig. 3, is a view in vertical section showing the coupling parts as connected but not locked together.
Figure 4:
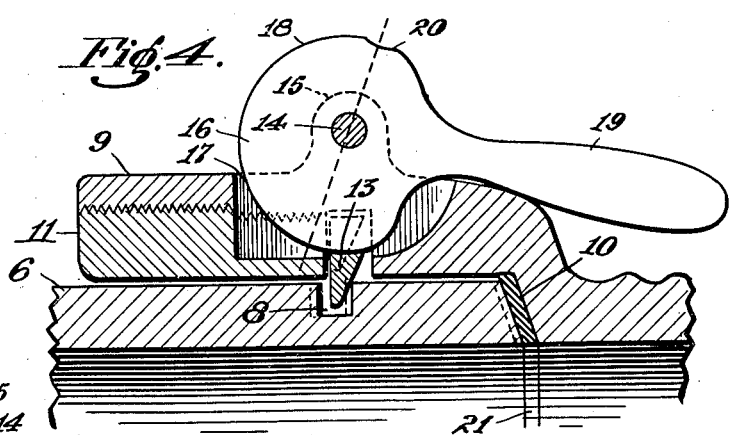
Fig. 4, is a view in section showing the manner of locking the parts together and indicating in dotted lines the position of the split ring and male member prior to being advanced by the cam.

In operation the member 6 is inserted in the member 9 with the beveled end 7 seating on a yieldable gasket 21 positioned on the shoulder 10, as shown in Fig. 3 and as indicated in dotted lines in Fig. 4. The cam is then rocked to the position shown in Fig. 4, causing the ring 13 to be depressed into the channel 8 to lock the member 6 against withdrawal and at the same time advance it by the wedge-like action of the beveled face of the ring into tight engagement with the gasket.

The cam will then be positioned with its most outwardly extending portion disposed past the ring so that pressure of the latter thereagainst will oppose retrograde movement of the cam thus effectively locking the cam and holding the ring in its contracted position. The handle of the cam will abut against the member 9 to limit its movement in either direction, and when in the locking position shown in Fig. 4 will extend over the reduced portion of the member 9 so that it may be readily grasped when it is desired to disconnect the coupling.

On restoring the cam to its normal position the ring will expand and clear the channel 8, whereupon the member 6 may be readily withdrawn.

Figure 5:
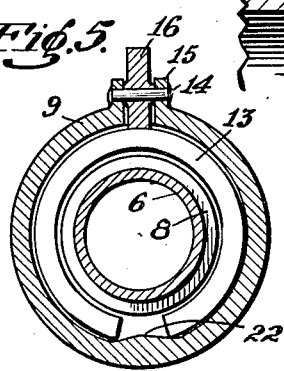
Fig. 5, is a view in cross section as seen on the line 5—5 of Fig. 2.

As a means for causing the split ring to extend into the annular channel throughout its length, a double inclined face 22 is formed on the inner wall of the member 9 at a point between the spaced ends of the ring 13, as shown in Fig. 5. On pressure being applied to the upper edge of the ring the ends thereof will advance toward each other and move upward on the inclined faces, thus advancing the ring toward its center uniformly throughout its length into the channel.

I claim:

1. A hose coupling, comprising a male member having a beveled end and formed with an external circumferential channel adjacent to the beveled end, a tube to receive said male member having a beveled shoulder, a gasket on said shoulder on which the end of the male member may seat, a split ring in said tube having a beveled face, a cam pivoted on said tube adapted to contract the ring into locking engagement with the channel on the male member, said beveled face on the ring operating to advance the male member, and means whereby the ring will oppose turning of the cam to lock the ring in its contracted position.

2. A hose coupling comprising a male member having a circumferential channel, a tube to receive said male member, a normally expanded resilient split ring in said tube through which the male member may pass, and means for contracting said ring into the channel on the male member.

3. A hose coupling comprising a male member having a circumferential channel, a tube to receive said male member, a normally expanded resilient split ring in said tube through which the male member may pass, means for contracting said ring into the channel on the male member, and means engageable with the terminals of the ring for causing them to move inwardly on contraction of the ring.

RALPH M. BRANDON.